Figure 1:
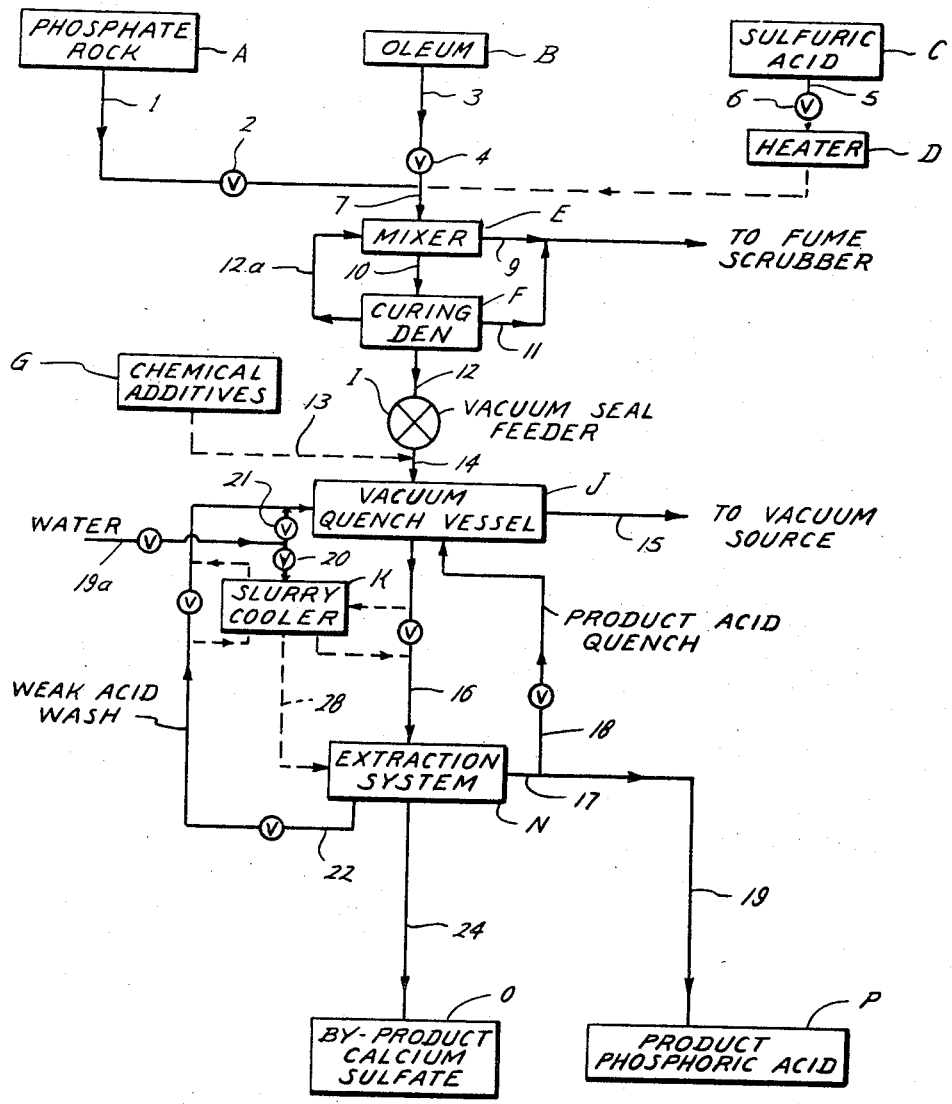

BOILING POINTS OF WET PROCESS
PHOSPHORIC AND SUPERPHOSPHORIC ACIDS

United States Patent Office 3,420,628
Patented Jan. 7, 1969

3,420,628
PROCESS FOR THE MANUFACTURE OF CONCENTRATED PHOSPHORIC ACIDS
Sam P. Robinson, Houston, Tex., assignor to James G. Brown & Associates, Inc., Houston, Tex., a corporation of Texas
Continuation-in-part of application Ser. No. 458,143, May 24, 1965. This application Apr. 25, 1966, Ser. No. 544,973
U.S. Cl. 23—165          22 Claims
Int. Cl. C01b 25/22

This invention is a continuation-in-part of my copending application Ser. No. 458,143, filed May 24, 1965.

This invention relates to the production of high analysis phosphoric acids and more particularly to the production of 50%–72% $P_2O_5$ content phosphoric acids from phosphate rock and concentrated sulfuric acid.

The aforementioned copending application discloses a process for the manufacture of concentrated phosphoric acid by reaction between ground phosphate rock and heated high concentration sulfuric acid and/or oleum.

The present invention is directed to improvements in the broadly disclosed process of the earlier application, the improvements including the employment of phosphate rock of much coarser particle sizes than heretofore considered satisfactory for phosphoric acid manufacturing and the step of quenching the resulting acidulate under high vacuum with a mixture of recycle wash acid from the product acid-solid separation and concentrated end-product phosphoric acid at the boiling temperature of said end-product acid under said high vacuum.

Generally stated and in accordance with my invention, proper proportions of coarse phosphate rock particles and strong sulfuric acid are mixed and allowed to react for a suitable period of time in a reactor vessel (den) to complete the reaction and produce an anhydrous acidulate high in molecularly dehydrated phosphoric acid content. This acidulate is then introduced into a quench vessel in which agitation is maintained and which contains a slurry of high $P_2O_5$ content phosphoric acid and co-product calcium sulfate solids. This quench vessel is operated under high vacuum at the boiling point of the product phosphoric acid under the vacuum, and the materials, comprising the hot acidulate recycle wash acid and product acid, are retained in the quench vessel for a time sufficient for the strong $P_2O_5$ content of the solubles in the acidulate to diffuse and reach equilibrium with the $P_2O_5$ content of the acid in the slurry. Hot product slurry may be cooled by heat exchange with the recycle quench tank dilution acid or water depending upon the concentration of the phosphoric acid being produced. After cooling, the strong product acid is separated from the co-product calcium sulfate in one or more extraction stages, preferably by centrifuging, whereby high $P_2O_5$ recovery is assured with minimum amount of wash water, the latter containing the wash acid being returned to the quench vessel.

Among the principal objects of the present invention are the provision of a process for obtaining high $P_2O_5$ content phosphoric acid in one step without the necessity of installing large concentration equipment; to obtain an anhydrous phosphoric acid high in molecularly dehydrated orthophosphoric acid content; to obtain high $P_2O_5$ recovery from phosphoric raw material; and to minimize the impurities present in the product acid.

Still another object is to produce strong phosphoric acids with a minimum of water added to the system.

A further object is to utilize the greatest practical portion of the heat of reaction between phosphate rock and sulfuric acid to evaporate water.

It is an important object of this invention to produce strong wet process phosphoric acids more economically than by more conventional processes.

Figure 2:
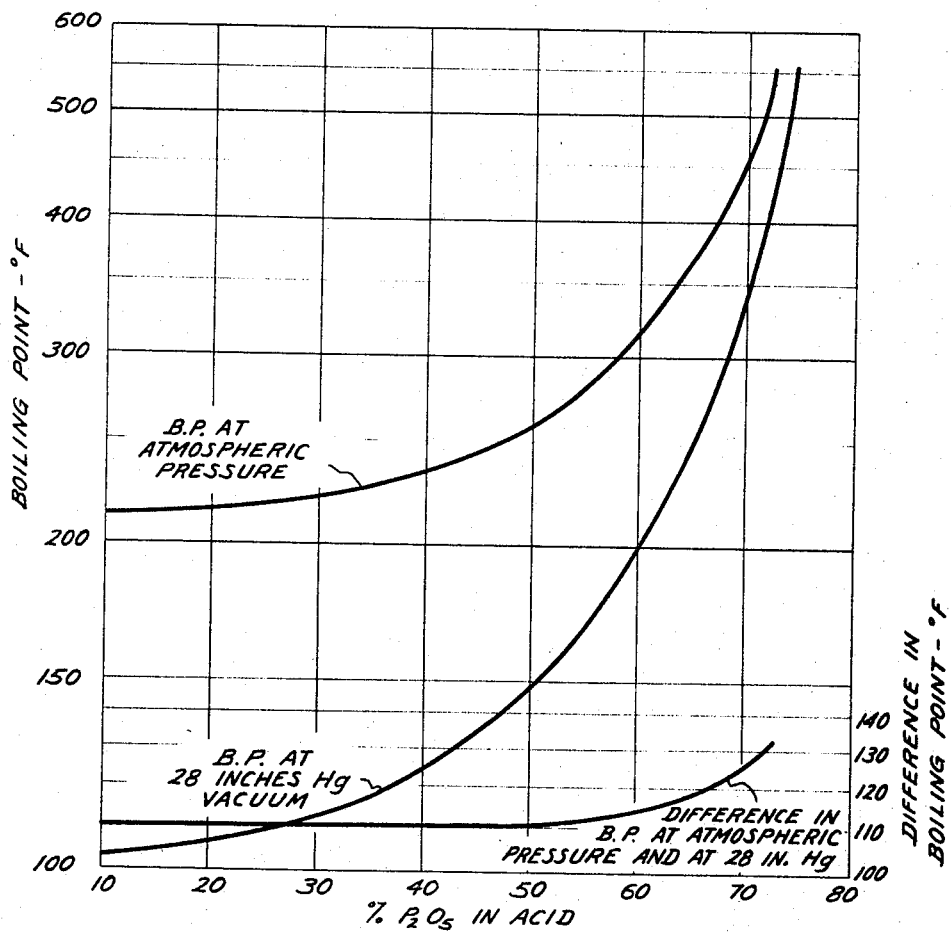

Other and more specific objects of this invention will become more readily apparent from the following detailed description when read in conjunction with the accompanying drawings which illustrate useful embodiments of the present process, wherein FIG. 1 is a flow diagram illustrating the procedure suitable for the production of concentrated phosphoric acid; and FIG. 2 is a chart of the boiling point curves of phosphoric acids at atmospheric pressure and under high vacuum.

Before detailing the procedures in accordance with my invention, the following observations and comments with respect to the present invention will be useful for a more complete understanding of the novel and advantageous features of the invention.

I have found that the temperature of the acidulate leaving the den is critical with respect to both the overall heat and water balance on the system. It is especially critical with respect to production of the higher $P_2O_5$ content acids. I have found that while my process will work satisfactorily with an acidulate temperature as low as 400° F. when producing 50% $P_2O_5$ acid with my preferred $P_2O_5$ recovery equipment, I nevertheless prefer minimum acidulate temperatures of approximately 500° F. and 550° F., respectively, for producing 60% and 71% $P_2O_5$ content acids. Higher temperatures ranging up to 650° F. may be used, depending on the nature of the $P_2O_5$ recovery methods which may be utilized. I can control the temperature of the acidulate leaving a well insulated den by several methods, viz:

(1) BPL (tricalcium phosphate) content of phosphate rock.
(2) Concentration of sulfuric acid and/or oleum.
(3) Temperature of phosphate rock.
(4) Temperature of sulfuric acid and/or oleum.
(5) Use of mixed sulfuric acid and oleum.

My process is adaptable to any commercially available phosphate rock. BPL contents of commercially available phosphate rocks range between 60% and 80%, with a wide range of impurities. Most of the phosphate rock used for producing phosphoric acid in the United States has a BPL content ranging from 68%–75%, although better grades are being rapidly depleted and may not be available in the future. Higher reaction temperatures are usually obtainable from higher BPL rock. Moisture contents of the phosphate rock is important since part of the heat of reaction which could raise the temperature of the acidulate is used up in evaporating water. Precalcined phosphate rock gives high acidulate temperatures if too much moisture has not been picked up in shipment and storage. If the calcined rock is used at the calcining location for making phosphoric acid, excellent reaction temperatures result from feeding the rock to the system at temperatures in excess of ambient conditions. It is, of course, possible to predry and/or preheat the phosphate rock to the reaction system for increasing reaction temperatures.

The concentration and/or temperature of the sulfuric acid used in the reaction can have a marked effect on reaction temperature and the physical condition of the acidulate as well. The concentration and temperature of the sulfuric acid chosen for my system will depend on the concentration of $P_2O_5$ in the phosphoric acid being produced and the BPL content, moisture content, and temperature of the phosphate rock being used. Normally, the higher the strength oleum used, the hotter the reaction temperature. If the rock is preheated, as low as 90%–93% sulfuric acid can be utilized. Use of such low strength acid, however, is not recommended unless rock is precalcined at source of phosphoric acid manufacture. Heated commercial 98% sulfuric acid is quite practical in producing 50%–60% $P_2O_5$ content acid if it is heated hot enough to insure required reaction temperature. The boiling point of 98% sulfuric acid at atmospheric pressure is in excess of 550° F. It thus can be preheated much hotter than oleums. The heat content of such heated acid is more than enough to insure desired acidulate temperature as well as evaporating its 2% residual moisture content in the reatcion. I have found that I can also obtain desired reaction temperatures by mixing oleum and sulfuric acid of less than 100% $H_2SO_4$ content without heating either acid. Heat of dilution of the oleum raises the temperature of the mixed acids. With proper proportion of the two acids, a lower oleum can be produced that is considerably hotter than ambient. Where mixed sulfuric acid and oleum are used I prefer to add the oleum to the rock before addition of the sulfuric acid. I find that better mixing and faster reaction are obtained with mixed acid addition in two steps. When using oleum alone, along with a reasonably high BPL rock, no heating of either raw material is necessary. I recommend heating of raw materials only when oleum is unavailable or high $P_2O_5$ content phosphoric acid is being produced from low BPL phosphate rock. In my process for producing lower $P_2O_5$ content acids, I can compensate for lower than preferred acidulate temperatures by heat exchange between product slurry and quench tank dilution feed liquor.

In my process I consider the size of the individual phosphate rock particles important. I prefer for the individual particle size to pass a standard 40 mesh screen opening with less than 10% by weight small enough to pass the openings in a standard 80 mesh screen. However, satisfactory performance is obtained with particles up to 20 mesh equivalent and with small amounts of fines that pass through 100 mesh openings. $P_2O_5$ recovery falls slightly with an excess of larger particles because of a tendency to blind the surface with a coating of co-product calcium sulfate before all of the phosphate can be reacted. While particles below 100 mesh react quickly and efficiently, the skeletal calcium sulfate residue is harder to remove from product phosphoric acid.

In my invention I consider uniform mixing of my two raw materials very important. Unlike conventional phosphoric acid processes where the reaction between phosphate rock and sulfuric acid takes place in an excess of liquid phase composed of sulfuric and phosphoric acids substantially diluted with water, my process reaction takes place with an excess of solid phase under anhydrous conditions with no free water present. It is thus necessary to take every precaution to insure that all phosphate rock surfaces by wetted with enough sulfuric acid to react with the particle. Sulfuric acid to rock ratios for optimum results are proportioned on a weight basis. Strong sulfuric acids and oleums are high specific gravity liquids. For this reason the ratio of liquid volume to solid surface is very limited. For close proportioning of raw materials I prefer very accurate weighing of individual raw materials controlled by very sensitive proportioning ratio controllers.

As mentioned earlier, I have found that improved mixing has been obtained when I used two-stage addition of oleum plus sulfuric acid. When my phosphate rock contains more fines than I prefer, I have found that improved mixing and larger average particle size of acidulate can be obtained by recycling a portion of the hot unquenched acidulate to the mixer. In general, the recycle will range from about 50% to about 150% by weight of the freshly formed acidulate.

Both batch and continuous mixers can be used in my invention. For larger scale production units I prefer continuous mixers. Depending upon the size of operation, I can utilize commercial mixing pans, single and multi-shafted pugmill-blungers and a variety of other intensive mixers. When I utilize two-stage mixing, I prefer more intensive, shorter duration, mixing in the first stage. My preferred mixer is a multishaft rotary pugmill for this service with self-cleaning of mixing blade tips, shafts and internal surface. The reaction between phosphate rock and sulfuric acid and/or oleum is initiated in the mixer section. The mass begins to heat up and fluoride vapors are given off which must be scrubbed to prevent air pollution and corrosion of building and equipment. All mixing equipment should be well insulated to conserve heat.

The reaction between phosphate rock and sulfuric acid and/or oleum is completed in a denning section. Last traces of free water in the rock and/or sulfuric acid are driven off. A major portion of the fluoride content of the rock is removed as a vapor and scrubbed. As the temperature of the mass continues to rise, the reaction between phosphate rock and sulfuric and/or oleum advances toward completion, ideal conditions are produced for molecular dehydration of anhydrous orthophosphoric acid to pyrophosphoric acid and its subsequent reaction with further molecular dehydration of additional orthophosphoric acid in the formation of tripolyphosphoric acid and higher polymers. These ideal conditions are available reactants at anhydrous conditions at temperatures above 400° F. and sufficient time in this environment for the reactions to go to completion. I prefer a residence time or reaction time in the denning step of forty-five minutes to an hour and a half, although good results have been obtained at high temperatures for times as low as ten minutes and at lower temperatures for times as much as four hours.

Either batch or continuous dens may be used for the denning step provided they are sufficiently insulated to conserve heat and maintain high reaction temperatures. For my invention I prefer the continuous den and I prefer the traveling grate type over the rotary type. Any commercial design used for producing single superphosphate can be utilized with minor changes. Removal of fluorides in the vapor phase is easier in a rotary den and some granulation of acidulate fines into larger agglomerates is obtained. No major problem is encountered in disintegrating the acidulated mass from a continuous traveling grate den since the mass does not set up like conventional single superphosphate. A conventional rotary cutter will easily break up acidulate when the traveling grate discharges, although I prefer to use slow moving helical knives with saw-tooth edges for breaking up the mass into controlled size agglomerates with a minimum of fines.

The higher the temperatures reached by the acidulate in the denning step, the higher will be the amount of fluoride impurity volatilized. Removal of free and combined moisture from the phosphate rock, molecular water from orthophosphoric acid initially produced, and decomposition of carbonates in the phosphate rock evolve enough vapors to keep the mass porous in the den. When part of the unquenched den discharge is recycled back to the mixer, additional porosity is imparted to the mass. Absence of moisture and the high temperatures of the den promote crystallinity of the co-product calcium sulfate. Continuous exposure of hot acidulate to high temperatures on the slowly moving grates allows growth of calcium sulfate crystals especially with recycling of part of reacted den discharge to the mixer.

In my invention the discharged product of the den system is preferably disintegrated to agglomerates of ¼ inch size and under. They are collected and conveyed in insulated equipment to a vacuum seal feeder above a large vacuum quench vessel. I utilize the sensible heat of both the hot insoluble solids and the soluble material in the acidulate to evaporate water from the boiling acid in the vacuum quench system. Vacuum is induced preferably in a two-stage system. Vaporized steam and other volatiles including additional fluorine compounds are quenched first in a conventional barometric condenser with water to impart vacuum to the quench vessel and this vacuum is further boosted by the second stage to the desired vacuum wanted in the quench vessel. Depending upon the vacuum desired, the second stage may consist of either a second or a second and third stage booster vacuum jet with steam injected in between stages and recondensed with additional water, or a high efficiency mechanical vacuum pump can be used to reject non-condensibles and obtain the desired vacuum.

Thermal effects in the vacuum quench vessel are different when producing 65% $P_2O_5$ content and lower phosphoric acids and when producing so-called superphosphoric acids that are anhydrous and contain molecularly dehydrated orthophosporic acids. In producing the lower analysis phosphoric acids, heat for evaporating water is supplied not only by the sensible heat from the soluble contents and insoluble solids but also by the exothermic rehydration of pyrophosphoric and polyphosphoric acid contents of acidulate back to orthophosphoric acid. When producing 68%–72% $P_2O_5$ content acids in my vacuum quench system, sensible heat from the insoluble solids under vacuum conditions is utilized to evaporate water from orthophosphoric acid until anhydrous conditions result and then part of this anhydrous orthophosphoric acid is further molecularly dehydrated to polyphosphoric acid to combine with that already in the acidulate to give desired polyphosphoric acid content.

Vacuum quenching of the hot acidulate concept in my invention improves the thermal efficiency of my process remarkably. In FIG. 2, I have shown boiling point curves of typical wet process phosphoric acids made from Florida phosphate rock over a wide range of concentrations at both the atmospheric boiling point and the boiling point at 28 inches of mercury vacuum, a typical high vacuum condition obtainable with conventional equipment. An inspection of these curves shows for example that a typical 54% $P_2O_5$ content wet process phosphoric acid that boils under atmospheric pressure at approximately 275° F. boils under 28 inches of mercury vacuum at approximately 164° F. If a hot acidulate at 500° F. is quenched in boiling 54% $P_2O_5$ content phosphoric acid at 275° F., the heat for boiling must come from cooling insoluble solids and soluble materials from 500° F. to 275° F. over a temperature difference of 225° F. If this same 500° F. acidulate were quenched in boiling 54% $P_2O_5$ content acid at 164° F. under 28 inches of mercury vacuum, heat available for boiling off water would come from cooling insoluble solids and soluble materials in the hot acidulate from 500° F. to 164° F. over a temperature difference of 336° F. Since the specific heats of both the solid and soluble portions of the hot acidulate are essentially constant over this range, almost 43% more heat from the acidulate can be extracted to boil off water under the vacuum condition.

The advantage of the vacuum quenching are four-fold, viz:

(1) Weaker acid can be used for quenching or alternately, stronger acid can be produced from the same quench acid.

(2) Impurities are not nearly as soluble in the same $P_2O_5$ content phosphoric acid at temperatures of the vacuum condition. Thus, more of the impurities soluble in phosphoric acid at 275° F. will not be in solution in the same strength acid at 164° F. Instead, they will be removed with co-product calcium sulfate which is usually thrown away.

(3) 54% $P_2O_5$ phosphoric acid is considerably more corrosive at 275° F. than at 164° F. At 164° F. processing equipment can be constructed of rubber or rubber lined steel or 316 stainless steels. At 275° F. much more expensive Hastelloy "C" or carbon equipment is necessary to prevent excessive corrosion.

(4) Feed quench liquor to the vacuum quench tank can be heat exchanged with product acid slurry to cool the latter and flash considerable extra steam from the heated feed liquor when it is introduced into the vacuum quench vessel. This is especially advantageous when producing more highly concentrated phosphoric acid of $P_2O_5$ content over 65% as shown later.

The advantages of the vacuum quench system are very important in the production of anhydrous phosphoric acids of 68%–72% $P_2O_5$ content. For example, 71% $P_2O_5$ content wet process phosphoric acid boils at approximately 492° F. and 370° F., respectively, at atmospheric pressure and at 28 inches of Hg vacuum. If the hot acidulate enters the vacuum quench vessel at 550° F., heat can be extracted over temperature ranges of 58° F. and 180° F., respectively, or approximately 300% more water can be evaporated at the high vacuum condition. Again less impurities are dissolved in the lower temperature acid, it is far less corrosive at the lower temperature, and a very considerable amount of steam can be flashed from incoming dilution liquor in heat exchange with hot product slurry.

If the strong phosphoric acid is to be chemically treated, I prefer in my invention to add treating agents and chemicals into the acidulate feed to the vacuum quench tank or in the quench tank itself. Dependent upon the end use of the product acid, a wide range of chemicals may be added at this point in the system. These could include flocculating aids to agglomerate fine solids to improve separation of calcium sulfate and acid and to improve washing efficiency, strong oxidizing agents to remove color and oxidize minor impurities to higher valences, barium salts to precipitate excess sulfuric acid, sodium salts to precipitate fluorides, potassium salts to precipitate iron and aluminum, etc.

Liquid is added to the vacuum quench system to lower the temperature of the anhydrous acidulate and to extract soluble $P_2O_5$. In my invention I prefer to maintain the solid to liquid ratio in the vacuum quench tank at as high a level as is compatible with the solids-liquid separating equipment to be utilized for recovery of concentrated phosphoric acid. I prefer to maintain this solids-liquid slurry at 30%–70% insoluble solids content, although good operation can be obtained at lower and higher insoluble solids contents. In my invention I prefer a residence time of thirty to ninety minutes for the slurry in the vacuum quench vessel, although I have obtained good results with retention times as low as five minutes with low solids content slurries and as high as four hours with insoluble solids contents in the slurry at 70%–75% solids. With high solids content in the slurry in the vacuum quench vessel and the following heat exchanger, I find I can relieve supersaturation of impurities in the strong phosphoric product acid on cooling very easily. The precipitate out on the large surface of solid particles instead of forming numerous small crystal nuclei and are very much easier to remove from the acid in later separating steps, thus allowing the production of a cleaner acid and a co-product calcium sulfate containing a major portion of the residual impurities from the phosphate rock. I require the speecified retention times in the vacuum quench vessel to allow equilibrium to be reached between the greater $P_2O_5$ content in the soluble content of the acidulate and the lower $P_2O_5$ content in the phosphoric acid in the slurry by diffusional processes.

In my invention I prefer to utilize the highest $P_2O_5$ content phosphoric acid for quenching compatible with the overall system heat and water balances dictated by the acid recovery process equipment used. When hot anhydrous acidulate is rapidly quenched by immersion in boiling low $P_2O_5$ content phosphoric acid, thermal strains result in the insoluble solid crystals which tend to fracture the crystals. This is very undesirable since it materially reduces the capacity and efficiency of process equipment used to recover strong phosphoric acid as well as producing excessive amounts of small solid particles which are difficult to remove from the product acid. I have found that these thermal strains are minimized when the hot acidulate is quench in the boiling phosphoric acids of high $P_2O_5$ content (50%–72% $P_2O_5$) even when there is a high temperature difference between the two mediums.

Necessity for cooling of product slurry from the vacuum quench system will depend upon the boiling point of the product acid at vacuum conditions and the $P_2O_5$ content of the desired product acid. Any cooling will result in precipitation of impurities from wet process acid. An intermediate surge tank for cooling slurry can be advantageous in the production of purer acids. The scope of my invention covers both the use and absence of such a vessel. It is unnecessary that such a vessel operate under vacuum conditions. Should such an intermediate surge vessel be used, the slurry can be cooled by installing a cooling coil in an agitated vessel, cooled in countercurrent shell and tube exchangers, or cooled in trombone type exchangers with water on the outside of the tubes. I prefer forced circulation shell and tube exchangers with slurry inside the tubes.

As the $P_2O_5$ content of product acid rises so does its boiling point at a very sharp rate of increase, as shown by the curves in FIG. 2. Highly concentrated wet process phosphoric acids, especially those over 68% $P_2O_5$ content, have very high boiling points even under vacuum conditions, are very corrosive at elevated temperatures, and have far greater solubility limits for various residual impurities from the phosphate rock. Recovery of sensible heat from these hot boiling acids becomes economic, less expensive process equipment can be utilized to recover phosphoric acid from the slurry at lower temperatures, and purer phosphoric acid can be produced when the slurry is cooled ahead of liquid-solid separations. A very important and relevant concept of my invention is the cooling of hot slurries high in soluble $P_2O_5$ content in countercurrent heat exchange with vacuum quench system dilution liquor with subsequent flashing of steam from such heating under vacuum conditions in the quench vessel. An impressive increase in total evaporation possible from quenching of hot acidulate is thus obtained over normal heat exchange under atmospheric pressure.

In my invention I can recover soluble $P_2O_5$ content from the liquid portion of slurry by several separation methods such as:

(1) Removing and washing the co-product calcium sulfate and other insoluble impurities from the phosphoric acid on a multistage vacuum washing filter such as normally used in conventional phosphoric acid plants.

(2) Countercurrent extraction of the acid in continuous leaching systems.

(3) Centrifugation of solids from the liquids in washing centrifuges.

In my invention I have found a way to utilize a minimum amount of water to produce a much higher $P_2O_5$ acid and a much drier waste solids product. Only enough water must be added to the system to satisfy the $P_2O_5$ requirements of the product phosphoric acid, to produce a dry co-product calcium sulfate 95% to 98% dry, and to furnish the water for very efficient utilization of available heat of reaction of the feed raw materials and removal of fluoride fumes. Unlike conventional processes, I do not have to add water for dilution of feed sulfuric acid, water for cooling and temperature control of the reaction mixture, water for hydration of co-product calcium sulfate to the dihydrate-gypsum $(CaSO_4) \cdot 2H_2O$, water in the 60%–65% by weight gypsum vacuum filter cake, and water to dilute filter cake so it can be pumped to waste. I can produce higher $P_2O_5$ content acid because sensible heat I use for evaporation of water is not wasted heating up a large recycle stream high in moisture content. I can produce more strong acid in smaller process equipment since I do not have to recycle large quantities of gypsum slurry for gypsum crystal growth and temperature control. I can produce stronger acids without additional sources of outside heat since I utilize the heat of my reaction to a far higher degree of efficiency than is available in more conventional processes; in so doing, I can utilize smaller process equipment and less of it. I need a large calcium sulfate particle size for efficient separation in a centrifuge; I obtain it by using larger phosphate rock particles in my reaction system and controlling process conditions that might degrade it, instead of going to the expense of fine rock grinding and then building up particle size in dilute slurries by cooling and large recycle rates that require larger and more expensive equipment. I further reduce size and cost of process equipment by carrying out my reaction at high temperatures for much shorter periods of time to get better results.

In my invention I have found that I can use one washing centrifuge satisfactorily to produce high $P_2O_5$ content wet process phosphoric acid with $P_2O_5$ recovery in excess of 96% of that in the feed phosphate rock. In producing anhydrous wet process phosphoric acid, high in polyphosphoric acid content, I prefer to use two centrifuges of smaller capacity in series. There are several reasons for this. The anhydrous acids are considerably more viscous than lower $P_2O_5$ content acids. Consequently, the "spun-dry" centrifuge cake not only contains less solids and more liquid but also the liquid remaining is higher in $P_2O_5$ content. Washing centrifuges do not have the displacement washing capacity of a vacuum filter. To keep down $P_2O_5$ losses in the waste calcium sulfate filter cake, it will be necessary to add considerable more wash water. While this is not critical when producing 50%–60% $P_2O_5$ content phosphoric acids, any excess water bypassing normal displacement washing will dilute product acid and dissolve extra impurities. I, therefore, prefer to use two centrifuge units in series. The first unit will separate strong product acid with no displacement washing. The discharge cake will be repulped with weak acid from the filtrate of the second centrifuge whose centrifuge cake can easily be washed. The second centrifuge will produce a drier "spun-dry" cake with lower $P_2O_5$ content in the liquid portion of the "spun-dry" cake which will be easy to work with and give excellent $P_2O_5$ recovery and with minor amounts of wash water. Neither centrifuge need be as large as a single unit installation.

Referring now to the flow diagram shown in FIG. 1, block A represents a source of phosphate rock raw material. This may be of any commercially available BPL content precalcined or uncalcined rock, preferably sized with a major portion by weight of particle sizes that will pass a standard 40 mesh screen and be retained on a standard 80 mesh screen with minor portions by weight up to through 20 mesh size and a similar small portion by weight through 100 mesh screen. The latter is preferably less than 10% by weight of the rock. The ground rock is conveyed from storage A by a conveyor, indicated as line 1, to a mixer E under continuous gravimetric feed control, symbolized by the valve 2.

The rock is mixed in mixer E with sulfuric acid closely proportioned by suitable control means to the phosphate rock feed. The composition, proportion, and temperature of the sulfuric acid used will depend upon such factors as BPL and moisture content of the phosphate rock and equivalent $H_2SO_4$ content of the sulfuric acid and/or equivalent $H_2SO_4$ over that stoichiometrically required to react with the total CaO content in the phosphate rock, provided this quantity is in excess of that required to stoichiometrically convert all $P_2O_5$ in the phosphate rock to orthophosphoric acid $(H_3PO_4)$. I can utilize oleum alone (such as oleum containing 104.5% equivalent sulfuric acid content), without preheating, preheated 98% sulfuric acid, or sulfuric acid less than 98% if heated hot enough and mixed with strong oleum, as previously discussed. In other words, I require a mixture of acid and rock under such conditions that assure a reaction mixture temperature in excess of 450° F. and preferably of 500° F., or above, in well insulated equipment. Block B illustrates a source of oleum, if used, and blocks C and D, respectively, illustrate a source of sulfuric acid and a sulfuric acid heater, if used. Oleum is pumped to the mixing system through a line 3 to a valve 4 and sulfuric acid is pumped through a line 5 under control of a valve 6 to the acid heater D, and from the acid heater to the mixer through a line 7. Oleum and preheated sulfuric acid may be premixed ahead of the mixture system in line 7.

Block E designates the acid-rock mixing system which may be single or two-stage, depending upon the source of the sulfuric acid used. Fluoride fumes from the mixer are withdrawn through a line 9 to a suitable and generally conventional fume scrubber system (not shown). Intimately mixed and partially reacted rock and acid, after a retention time of from about one to about five minutes in mixer E, is discharged via line 10 to a curing den F, which may be either a batch or continuous system, as previously noted. The den should be well insulated to conserve heat. Retention time in the den may range from ten minutes to four hours, depending upon the temperature of reaction obtained, but preferably is between forty-five minutes and one and one-half hours. There is a strong evolution of vapors from the den which are educted by suitable means (not shown) through a duct system 11 to the fumes scrubber system. The anhydrous acidulate product is excavated or broken down to particulate masses at the end of the den reaction by generally conventional equipment (not shown), but which is ordinarily a part of the den structure. The resulting particulate material is transferred via a line 12 through a vacuum feeder I and thence through a line 14 to a vacuum quench vessel J. Frequently, as noted previously, it will be found desirable to recycle a portion of the acidulate from the curing den to the mixer, in order to improve the physical character and porosity of the acidulate. Where such recycling is employed, the quantity recycled via line A will generally range between about 50% and about 150% of the fresh acidulate being formed in the mixer. Chemical additives, if desired or required, may be fed under controlled conditions from a source G through a line 13 to quench vessel J. The latter will preferably be equipped with an agitator, not shown.

A controlled slurry concentration of 30% to 75% by weight of insoluble solids suspended in boiling concentrated phosphoric acid is maintained in vacuum quench vessel J by the additions of hot acidulate and recycled hot dilution acid. The slurry concentration will depend in general on the type of solids-liquid separation utilized later in the production recovery system. If a washing centrifuge is used, insoluble solids concentration will be maintained between about 50% and about 75% by weight, and preferably in the range from about 60% to 65% by weight. If a multistage countercurrent vacuum washing filter is utilized to separate solids and acid, the slurry concentration will be regulated to maintain between about 30% and about 40% by weight of insoluble solids, and preferably from about 35% to about 36% by weight.

Vacuum is induced in vessel J through a duct 15 connected to a vacuum system of any conventional design adapted to produce the desired degree of vacuum in vessel J, while condensing the steam liberated therein. Such conventional systems will generally include barometric condensers, multistage ejectors, vacuum pumps, and the like.

The temperature maintained in quench vessel J will depend upon the concentration of the acid to be produced, the degree of vacuum maintained in the vessel and the boiling temperature of the product acid at the reduced pressure.

The hot slurry from quench vessel J is fed by a line 16 to the extraction system, designed by a block N, which may be of any suitable or conventional design. The particular system for separating isoluble solids from boiling product phosphoric acid and the degree of cooling of slurry from vessel J will depend upon economics generally, the boiling point of the acid and the choice of process equipment. While a continuous perforated bowl washing centrifuge is preferable and satisfactory, more conventional countercurrent vacuum washing filters may be used, as also may countercurrent extraction of the phosphoric acid in continuous leaching equipment. The soluble $P_2O_5$ in the slurry may be recovered with minor dilution in any of this process equipment.

As noted, the preferred process for recovering soluble $P_2O_5$ values from the slurry in accordance with this invention, involves the use of a continuous perforate bowl washing centrifuge with 150 mesh filtering screen. In this case, slurry from vacuum quench vessel J, containing approximately 60% by weight of solids is pumped via a line 16 to the centrifuge constituting extraction system N. Strong filtrate, comprising the product acid, is discharged from extraction system N via line 17 and is split into two portions, one portion is returned via a line 18 back to quench vessel J for slurrying the den product therein, while the other portion, comprising the net product acid, is removed from the system via a line 19 to product storage, designated P. Should the slurry leaving the quench vessel be at a temperature likely to damage or corrode the centrifuge, it may be cooled by taking a side stream of the slurry from line 16 through a slurry cooler K, of any suitable and generally conventional form, wherein the slurry may be cooled by water supplied from a line 19a, then passed via a line 28 to the extraction system as wash water for use in the centrifuge. When the centrifuge is used to extract the acid all the water necessary for a heat and material balance in the system cannot be used for washing. Consequently, additional water is injected with a weak wash from the extraction system through a line 22 and discharged to quench vessel J to dilute returned strong acid from line 18. Washed co-product calcium sulfate, essentially dry and low in $P_2O_5$ content is conveyed via line 24 to by-product storage O.

When producing very strong $P_2O_5$ content phosphoric acids high in polyphosphoric acid content, I find it very desirable to cool product slurry from the vacuum quench vessel J with recycled dilution liquor in place of water. In such cases, I prefer to use multistage countercurrent slurry coolers in series with boiling dilute acid in these stages vented back to either the vacuum quench vessel J or to the vacuum vapor line 15. By so doing, I find I can almost triple steam generation and removal from system. By use of multistage countercurrent slurry coolers with the dilute acid side boiling under high vacuum, I am able to greatly increase temperature differences and thus greatly reduce the heat transfer surface required.

The above described system may be employed to produce concentrated phosphoric acid of any desired concentration but more particularly for acids ranging from 50% to 72% $P_2O_5$ content by regulation of the temperatures maintained in the den and in the quench vessel, and by the amount of water evaporated in the quench vessel.

The vacuum maintained in the quench vessel may be varied but will generally be in the range from about 16"–28" Hg. For the higher concentration acids, the vacuum will preferably be maintained as near the maximum stated.

The following are examples illustrating application of the process to the production of two different high concentration phosphoric acids:

EXAMPLE 1

Production of 60% $P_2O_5$ content acid

In continuous operation, 1000 lbs. of 68% BPL uncalcined Florida phosphate rock sized 90% −40+80 mesh and with a chemical analysis of 45.3% by weight CaO, 31.6% $P_2O_5$, 3.9% F., 3.0% $Fe_2O_3+Al_2O_3$, and 8.5% $SiO_2$ was intimately mixed with 815 lbs./hr. of 104.5% $H_2SO_4$ oleum at ambient temperature for an average retention time of two minutes in a well insulated, double shafted, pugmill with back mixing paddles. The hot reacting mixture was continuously fed into a moving bed continuous den that was well insulated. After ninety minutes average retention time an anhydrous acidulate at 500° F. was produced at a rate of 1,678 lbs./hr. During a one hour period after the system had reached equilibrium, 137 lbs. of vapors from the pugmill and den were condensed in a circulating 5% solution of sodium hydroxide recycled through a scrubber packed with carbon raschig rings.

The hot acidulate was extruded at a continuous rate through a specially designed feed opening into an agitated quench vessel containing a slurry of 60% insoluble solids suspended in 60% $P_2O_5$ content phosphoric acid boiling at 200° F. and 28 inches of Hg vacuum induced by a barometric condenser and a high efficiency mechanical vacuum pump for boosting vacuum and rejecting noncondensible vapors to the atmosphere. Consistency of the slurry was regulated by recycling 250 lbs./hr. of 60% $P_2O_5$ strong acid, 97 lbs./hr. of 26% weak wash, and by adding 162 lbs./hr. of water. Gas analysis and flow measurements in the duct ahead of the barometric condenser and in the discharge line from the mechanical vacuum pump indicated that 153 lbs./hr. of steam was evolved from the vacuum quench vessel. Slurry was withdrawn from the vacuum quench vessel at the rate of 2,034 lbs./hr. after a calculated average retention time of 60 minutes and pumped to a continuous washing centrifuge with a perforate basket of 150 standard screen mesh. The solids were "spun-dry" and washed with water at the rate of 100 lbs./hr. continuously. 1276 lbs./hr. of centrifuge cake were obtained containing 3 lbs./hr. insoluble $P_2O_5$ and 6 lbs./hr. of water soluble $P_2O_5$. Insoluble solids totalling 1,220 lbs./hr. were obtained. 761 lbs./hr. of strong filtrate analyzing 60% available $P_2O_5$ was obtained of which 511 lbs./hr. was net make and 250 lbs./hr. was recycled to the vacuum quench vessel for consistency control. 97 lbs./hr. of 26% $P_2O_5$ content weak filtrate was recovered, all of which was recycled to the vacuum quench vessel for consistency control.

The strong product acid was quite clean at 180° F. Some precipitation occurred after standing overnight. $P_2O_5$ recovery in product acid calculated to be 97.1% of $P_2O_5$ in phosphate rock. Residual F in strong acid calculated to be 9.92% of F in the rock.

EXAMPLE 2

Production of 71% $P_2O_5$ content acid

In a continuous operation 1000 lbs./hr. of precalcined 75% BPL Florida phosphate rock, sized 90% —40+80, and with a chemical analysis of 49.95% by weight CaO, 34.52% $P_2O_5$, 3.89% F, 1.55% $Fe_2O_3+Al_2O_3$, and 4.98% $SiO_2$ was intimately mixed with 900 lbs./hr. of 104.5% $H_2SO_4$ oleum at ambient temperature for an average retention time of one minute in a well insulated, double shafted, pugmill with back mixing paddles. The hot reacting mixture was continuously fed into a moving bed continuous den that was well insulated. The hot mixture was moved through the den with an average residence time of seventy-five minutes to produce 1,743 lbs./hr. of anhydrous acidulate at 550° F. and 157 lbs./hr. of vapor which were collected in 5% sodium hydroxide solution in a scrubber. The den was well insulated.

The hot acidulate was continuously extruded through a specially designed feed opening into an agitated quench vessel containing a slurry of 60% insoluble solids suspended in 71% $P_2O_5$ content phosphoric acid boiling at 370° F. and 28 inches of Hg vacuum induced by a barometric condenser and a high efficiency mechanical vacuum pump for boosting vacuum and rejecting noncondensible vapors to the atmosphere. Consistency of the slurry was regulated by recycling 544 lbs./hr. of 49.5% $P_2O_5$ content phosphoric acid which was composed of a mixture of 320 lbs./hr. of 71% $P_2O_5$ content centrifuged strong acid and 224 lbs./hr. of 19% $P_2O_5$ content weak acid wash from the recovery system. The mixed acid is heat exchanged with 2150 lbs./hr. of hot slurry pumped from the vacuum quench vessel to the $P_2O_5$ recovery system after a residence time of about 60 minutes in the quench vessel. The hot slurry in the tube side of two exchangers in series is cooled from 370° F. to 180° F. The dilution acid to the quench vessel is pumped through the shell side of these exchangers and allowed to flash in the second body before introduction into the vacuum quench vessel. Net steam flashed in the vacuum quench vessel was measured at 417 lbs./hr. of which approximately two-thirds was estimated to have flashed from the heated recycled dilution acid under vacuum conditions in the shell sides of the heat exchangers.

The 2150 lbs./hr. of slurry cooled to 180° F. was fed to a first stage continuous centrifuge of a two centrifuge system. No attempt was made to wash the "spun-dry" centrifuge cake in this unit. A separation was made producing 792 lbs./hr. of 71% $P_2O_5$ content acid and 1358 lbs./hr. of 95% insoluble solids centrifuge cake containing 1290 lbs./hr. of insoluble solids and 68 lbs./hr. of 71% $P_2O_5$ content acid. The centrifugate was split up on the basis of 472 lbs./hr. of product 71% $P_2O_5$ content acid and 320 lbs./hr. recycled for consistency control in the vacuum quench vessel after mixing with recovered weak acid and heat exchange with product slurry.

The unwashed solids cake from the first centrifuge was repulped with water and recycled centrifugate from a second centrifuge to an insoluble solids consistency of 60% by weight and pumped to the second centrifuge. 196 lbs./hr. of total water was added to the second centrifuge system. Half was used to wash the "spun-dry" centrifuge cake and the other half was added to the repulper. The centrifugate from the spin-dry operation and the washing in the second centrifuge were mixed with 224 lbs./hr. of the mixture being recycled back to the vacuum quench vessel heat exchanger and the balance recycled to the repulper.

Washed centrifuge cake from the second centrifuge was produced at a rate of 1330 lbs./hr. It contained 1290 lbs./hr. of insoluble solids including 3.5 lbs./hr. of insoluble $P_2O_5$ and 6.0 lbs./hr. of soluble $P_2O_5$. $P_2O_5$ recovery in product acid represents 97.2% of total $P_2O_5$ in phosphate rock. Equivalent F in the product acid was only 7.92% of total F in the phosphate rock. In both centrifuge separations, larger particles stratified adjacent to the perforate screen and apparently acted as a filter aid for removing smaller fines from the centrifugate which was quite clear at 160° F. and clouded up from overnight cooling to only a slight extent. There was no apparent tendency to blind the openings of the 150 mesh perforate screen.

From the foregoing it will be evident that my invention provides a greatly improved and highly efficient process for making high-concentration, high-purity phosphoric acids. It will be understood that various changes and modifications may be made in the illustrative embodiments within the scope of the appended claims but without departing from the spirit of this invention.

What I claim and desire to secure by Letters Patent is:

1. In the production of concentrated wet process phosphoric acid by a process which includes the steps of introducing into a mixing zone particulate phosphate rock with concentrated sulfuric acid to initiate reaction therebetween, and continuing the reaction in a reaction zone at a temperature and for a time sufficient to produce a hot phosphoric acid-containing substantially anhydrous acidulate, and thereafter recovering product acid from said acidulate, the improvement which comprises the steps of:

(a) mixing the hot acidulate from the curing zone with a quench fluid comprising weak acid wash and product phosphoric acid in a quench zone maintained under a substantial sub-atmospheric pressure to form therein a liquid-solid slurry with said acidulate, (b) maintaining said slurry at the boiling temperature of said product phosphoric acid at said sub-atmospheric pressure for a time sufficient to effect substantial equilibrium between the $P_2O_5$ content of the slurry with that of said product phosphoric acid, (c) separating product acid from solid products in said slurry, (d) washing the separated solids with water to produce said weak acid wash; and (e) recycling said acid wash together with a portion of said product acid to said quench zone.

2. The process according to claim 1, wherein at least 80% by weight of said phosphate rock is sized to pass 40 mesh screen and be retained on 80 mesh screen.

3. The process according to claim 1, wherein said sulfuric acid comprises oleum of at least 104.5% $H_2SO_4$ content.

4. The process according to claim 1, wherein said sulfuric acid comprises a mixture of 98% sulfuric acid and oleum.

5. The process according to claim 1, wherein said sulfuric acid comprises 98% sulfuric acid preheated to a temperature effective to produce the desired temperature in said reaction zone.

6. The process according to claim 1, wherein the temperature maintained in said reaction zone is in the range from about 400° F. to about 650° F. for time ranging from about fifteen minutes to about four hours.

7. The process according to claim 1 including the step of recycling a portion of the acidulate produced in said reaction zone to said mixing zone.

8. The process according to claim 7 in which the recycled portion of the acidulate is an amount ranging from about 50% to about 150% by weight of the materials changed to said mixing zone.

9. The process according to claim 1, wherein the sub-atmospheric pressure maintained in said quench zone is in the range from about 16" to about 29" of Hg vacuum.

10. The process according to claim 1, wherein the sub-atmospheric pressure maintained in said quench zone is in the range from about 24" to about 28" of Hg vacuum.

11. The process according to claim 1 in which the weight of insoluble solids in said quench zone is maintained at 30%–70% solids content.

12. The process according to claim 1, wherein said slurry is maintained in said quench zone for a period ranging from about 10 to about 90 minutes.

13. The process according to claim 1, wherein said slurry in said quench zone is maintained at about 370° F. under a vacuum of 28" of Hg and for a time of about 60 minutes, and the product phosphoric acid returned to said quench zone is 71% $P_2O_5$ content acid.

14. The process according to claim 1, wherein said slurry in said quench zone is maintained at about 200° F. under a vacuum of 28" of Hg, and for a time of about 60 minutes, and the product phosphoric acid returned to said quench zone is 60% $P_2O_5$ content acid.

15. The process according to claim 1 including the step of cooling said slurry from said quench zone prior to separating said product acid therefrom to a temperature below about 200° F.

16. The process according to claim 1, wherein the proportion of said product acid returned to said quench zone constitutes from about 25% to about 40% of said product acid.

17. The process according to claim 1, wherein the step of separating said product acid from solid product in said slurry is performed by subjecting said slurry to centrifuging.

18. The process according to claim 17, wherein said centrifuging is followed by the steps of washing the separated solid products with water to remove additional product acid from said solid products, and cycling the resulting diluted product acid to said quench zone.

19. The process according to claim 18, wherein said centrifuging is performed in at least two successive stages, the step of washing the separated solids with water is applied only to the second of said stages, and a portion of the product acid from the first of said stages and the diluted product acid from said second stage are recycled to said quench zone.

20. The process according to claim 1, wherein said sulfuric acid comprises a mixture of oleum and 98% sulfuric acid, and wherein said mixture is effected by first adding the oleum to the rock followed by addition of said 98% sulfuric acid.

21. The process according to claim 1, wherein the temperature maintained in said reaction zone is at least 500° F. for a period of from about 45 minutes to about 90 minutes.

22. The process according to claim 1 including the additional steps of:

cooling said slurry from said quench zone prior to separating said product acid therefrom by heat interchange with said recycle quench fluid whereby to heat the latter to a temperature sufficient to evaporate water therefrom, and flashing water vapor from said fluid to increase the $P_2O_5$ content of said fluid before introducing said fluid into said quench zone.

References Cited

UNITED STATES PATENTS 3,161,467   12/1964   Hignett et al. _____ 23—165

EARL C. THOMAS, *Primary Examiner.*

A. GREIF, *Assistant Examiner.*